(12) United States Patent
Beransky et al.

(10) Patent No.: US 10,596,659 B2
(45) Date of Patent: Mar. 24, 2020

(54) CONVEYOR SYSTEM AND METHOD FOR HIGH SPEED MATERIAL SHEET PROCESSING

(71) Applicant: Amada America, Inc., Buena Park, CA (US)

(72) Inventors: Michael Beransky, Irvine, CA (US); Mihai Cioclei, Chino Hills, CA (US); Joseph Elkin, Deerfield, IL (US); Jose Garcia, Los Angeles, CA (US)

(73) Assignee: Amada America, Inc., Buena Park, CA (US)

( * ) Notice: Subject to any disclaimer, the term of this patent is extended or adjusted under 35 U.S.C. 154(b) by 0 days.

(21) Appl. No.: 16/434,103

(22) Filed: Jun. 6, 2019

(65) Prior Publication Data

US 2019/0283181 A1    Sep. 19, 2019

Related U.S. Application Data

(63) Continuation-in-part of application No. 15/064,540, filed on Mar. 8, 2016, which is a continuation-in-part
(Continued)

(51) Int. Cl.
*B23K 26/08* (2014.01)
*B23K 26/38* (2014.01)
(Continued)

(52) U.S. Cl.
CPC ...... *B23K 26/0846* (2013.01); *B23K 26/0876* (2013.01); *B23K 26/16* (2013.01);
(Continued)

(58) Field of Classification Search
CPC ............ B23K 2101/16; B23K 26/0846; B23K 26/0876; B23K 26/16; B23K 26/38;
(Continued)

(56) References Cited

U.S. PATENT DOCUMENTS 4,615,510 A * 10/1986 Lehmler .............. B23Q 7/1426
266/48
5,590,758 A    1/1997 Wilkins et al.
(Continued)

OTHER PUBLICATIONS

English translation of EP 1847350 (Year: 2007).*

*Primary Examiner* — Dana Ross
*Assistant Examiner* — Joe E Mills, Jr.
(74) *Attorney, Agent, or Firm* — Cionca IP Law P.C.; Marin Cionca

(57) ABSTRACT

A conveyor system for rapidly moving and simultaneously processing material sheets through several processing stations, the conveyor system including a chain that moves in an endless loop, and noncontiguous operational and standby skid sections for supporting material sheets and moving with the chain in the endless loop; wherein the conveyor indexes through the processing stations, such that, after each indexing, the conveyor has one skid section that is in operational position associated with each of the processing stations, thus allowing each of the processing stations to operate simultaneously on the associated skid section, during each time period when the conveyor is stopped, after each indexing.

18 Claims, 9 Drawing Sheets

Related U.S. Application Data of application No. 13/987,002, filed on Jun. 24, 2013, now abandoned.

(51) Int. Cl.
*B23K 37/02* (2006.01)
*B23K 37/04* (2006.01)
*B23K 26/16* (2006.01)
*B23K 101/16* (2006.01)

(52) U.S. Cl.
CPC .......... *B23K 26/38* (2013.01); *B23K 37/0235* (2013.01); *B23K 37/0408* (2013.01); *B23K 2101/16* (2018.08)

(58) Field of Classification Search
CPC ............ B23K 37/0235; B23K 37/0408; B23K 26/0838; B32K 26/083
USPC .................................................... 219/121.82
See application file for complete search history.

(56) References Cited

U.S. PATENT DOCUMENTS

| | | | |
|---|---|---|---|
| 5,632,915 A | 5/1997 | Schnetzer et al. | |
| 5,648,002 A * | 7/1997 | Omote ............... | B23K 26/0838 219/121.82 |
| 6,156,996 A * | 12/2000 | Alber ................. | B23K 26/0838 219/121.63 |
| 6,377,864 B1 | 4/2002 | Lindstrom | |
| 2004/0202531 A1 | 10/2004 | Beransky et al. | |
| 2009/0212033 A1 | 8/2009 | Beck et al. | |
| 2011/0220468 A1* | 9/2011 | Andrews ............ | B23K 26/0838 198/847 |

* cited by examiner

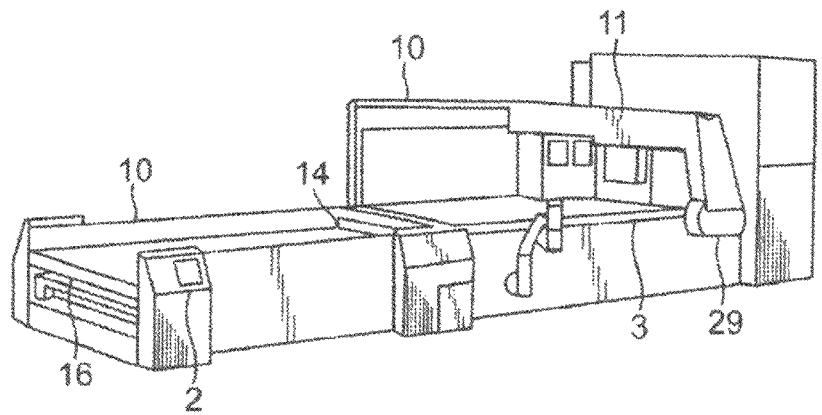
FIG. 1 - Prior Art
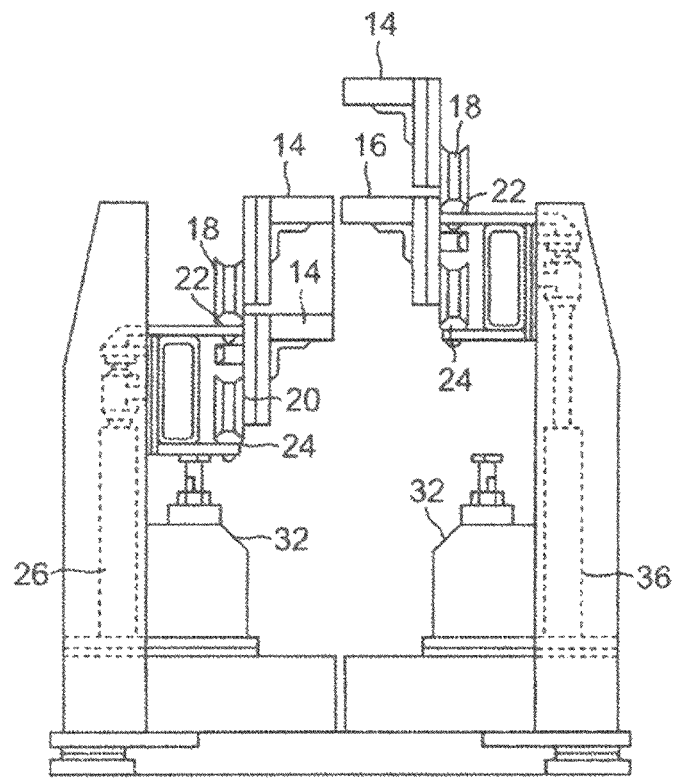
FIG. 2 - Prior Art

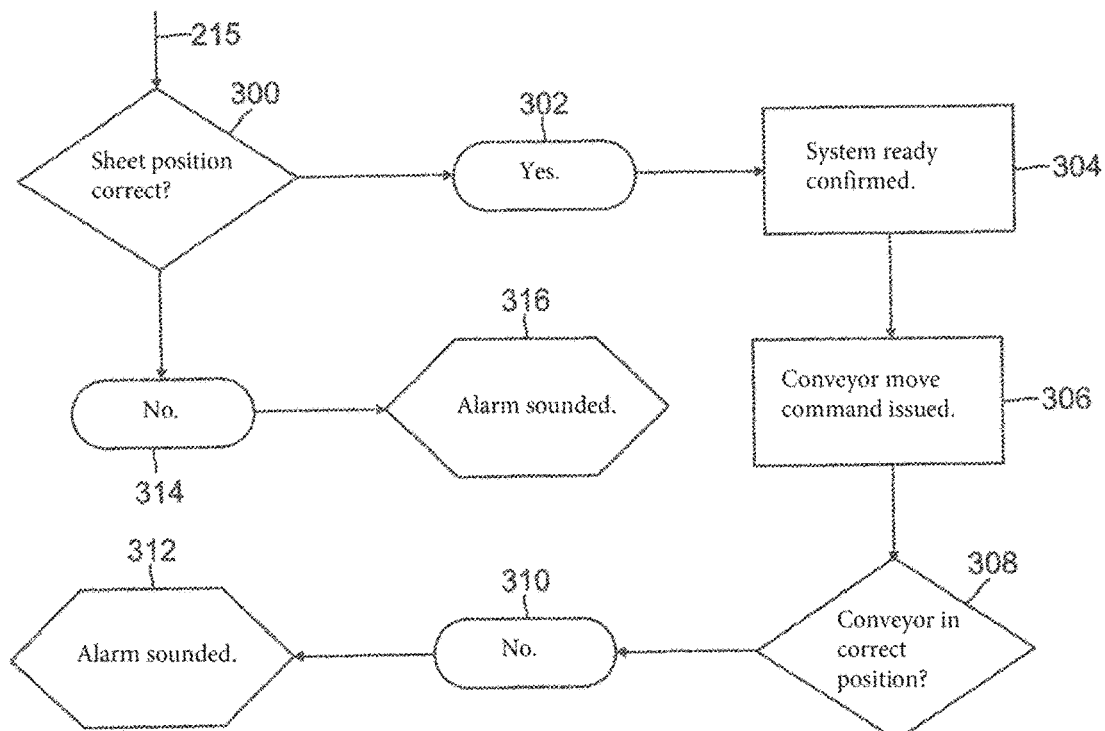
FIG. 7
Continued from 308 of FIG. 7.

CONVEYOR SYSTEM AND METHOD FOR HIGH SPEED MATERIAL SHEET PROCESSING

CROSS-REFERENCE TO RELATED APPLICATIONS

This application is a continuation-in-part of U.S. application Ser. No. 15/064,540 filed Mar. 8, 2016, which is a continuation-in-part of U.S. application Ser. No. 13/987,002, filed Jun. 24, 2013, which are hereby incorporated by reference, to the extent that they are not conflicting with the present application.

BACKGROUND OF INVENTION

1. Field of the Invention

The invention relates generally to conveyor systems and methods and more particularly to an improved conveyor adapted for use in a system that loads, processes (e.g., cuts), and unloads a variety of sheet metal parts, especially when the cutting process is being performed by a high-speed laser.

2. Description of the Related Art

Sheet metal products are typically formed in a piece of sheet metal and connected to the sheet metal through one or more micro-joints. In order to separate the formed parts, it is conventional that subsequent mechanical or manual hammering or vibrating is carried out with respect to the sheet metal.

The use of a moving table to transport sheet metal may be an effective system when the laser unit operates at a slower pace. However, for faster laser units, which require processing of complete sheets in for example less than two minutes, the conventional moving table systems have been found to be inefficient. When the total load, cut, unload and sort process for a metal sheet is to be completed in for example two minutes or less, a high-speed, robust and smart conveying system is required.

For example, a fiber laser cutting system (designated the FOL-AJ) for cutting material has been developed by Amada America, Buena Park, Calif., the applicant of the instant application. The FOL-AJ system was designed to take full advantage of the unique cutting capabilities of fiber laser processing. The advanced motion system and an innovative beam delivery system keeps pace with the cutting speeds and capabilities of the fiber resonator. The result is an extremely productive fiber laser system that delivers speed, accuracy, and edge quality, even in thick sheets.

Although moving tables have been successfully utilized in the cutting operation noted hereinabove, there are inherent limitations in their use with high-speed laser systems, such as the FOL-AJ. For example, Amada offered a FOL-AJ based system using a plurality of moving tables to convey material to the laser cutter. In this system, a movable table is loaded with material, the table traveling into/out of the laser device for each cycle. An empty moving table is loaded with the new material while the laser is processing the previously loaded material. After a moving table delivers the loaded material to the laser, and the material exits the laser, a different moving table is loaded with new material (a robot first unloads the cut parts before new material can be loaded onto a moving table). In addition, scraps must be unloaded before new material is loaded onto a moving table. Although this system performs well, the use of moving tables in this process limits the overall processing speeds (e.g., loading, plus laser cutting, unloading and scrap removal), and, as a result, the processing times are less than desirable.

Further, standard endless belt or chain conveyors move material, parts, etc. from one location to another in normal conditions. However, prior art endless belt or chain conveyor are not capable of passing through the inside of the laser cutting machine without damage from the laser beam, dust and slugs generated during the laser cutting process (the term "slug" refers to the buildup of material from metal cutting/melting).

What is thus desired is to provide an improved material conveyor system adapted for use in laser processing systems which overcome the disadvantages of using the prior art systems as noted hereinabove.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, the present invention provides an automated system for handling material and parts and scrap cut therefrom and in particular, an improved conveyor system that enables high-speed laser material cutting.

In another aspect, the system uses a conveyor for the material, the conveyor moving sheet material into the laser for cutting purposes. The empty conveyor space is loaded with new material simultaneously, as the laser is processing the previously loaded sheet of material and as parts from previously processed material sheet are unloaded from the conveyor. Then, the conveyor is indexed one position, so as another section of the conveyor becomes available for new loading, new sheet material is loaded into the laser and processed material is moved from the laser to the part unloading station, all processes occurring at the same time. The above sequence is then repeated. Thus, an advantage is greatly reduced processing times.

In another aspect, a robot then unloads the parts from the processed sheet material while new sheet material is being loaded on the side of the conveyor opposite where the laser is positioned. The conveyor is further indexed and scrap is automatically unloaded, all the processes occurring simultaneously.

In another aspect, the conveyor features noted hereinabove significantly decreases the system processing time compared to systems using moving (shuttle) tables and is particularly adaptable for use with high-speed lasers, such as the FOL-AJ system noted hereinabove.

In another aspect, the sheet metal material is precut to specific lengths, allowing many types and thicknesses of material to be loaded and processed on a sheet by sheet basis. Parts are picked up by a robot and stacked in preparation for the next process (bending, welding, etc.). Scrap is destructed during the last process and is automatically dumped into a scrap box as the conveyor indexes. A material storage tower with a sheet by sheet loading process is also provided.

In another aspect, an important feature of the present invention is the provision of multiple chain rows to support the material and create clearance for slug drop-down. Since the chain is passing through the laser, structure is provided to support the chain on the top and bottom and to protect the chain from damage that normally would be generated during the laser cutting operation.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which:

FIGS. 1 and 2 are views of a prior art conveyor systems.

FIG. 3-*a* illustrates a simplified top view of a conveyor, according to an aspect FIG. 3-*b* illustrates a simplified elevation view of the conveyor from FIG. 3-*a*, according to an aspect.

FIGS. 6-13 are computer flowcharts for the operation of the conveyor system of the present invention, according to several aspects.

DETAILED DESCRIPTION

Figure 3:
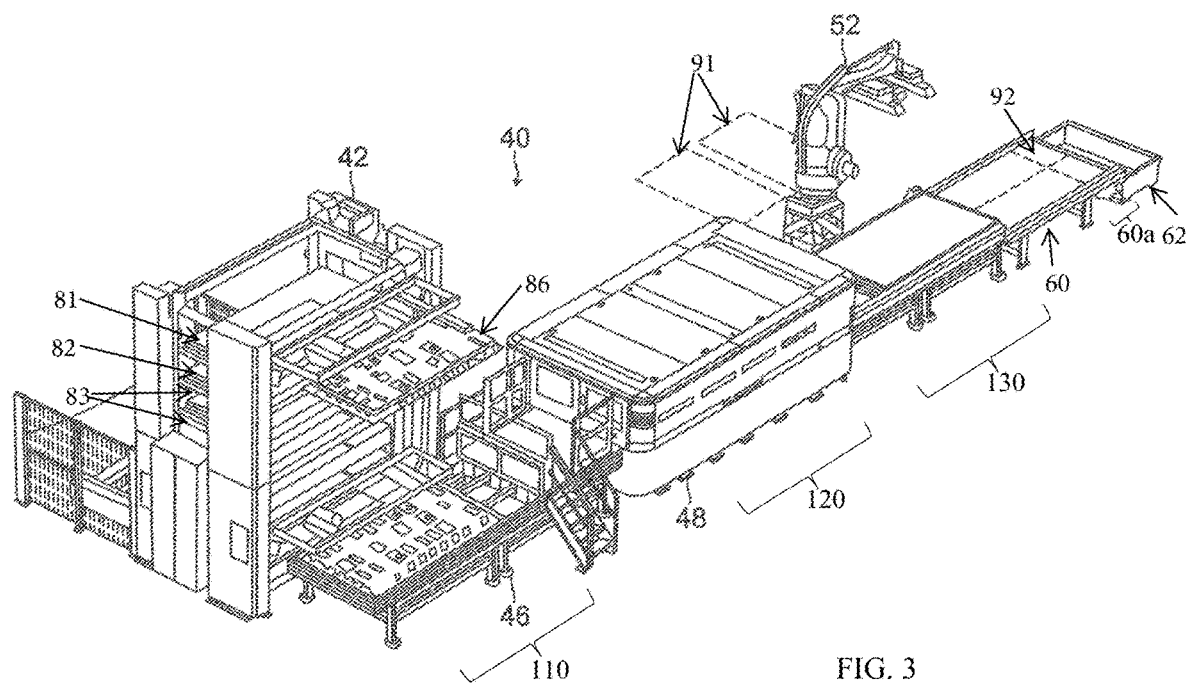
FIG. 3 is a perspective view of the conveyor system of the disclosed invention used in a laser material cutting system, according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

FIGS. 1 and 2 illustrate a prior art system 10 for handling material and parts cut therefrom utilizing movable tables. System 10 comprises laser cutting device 11, shuttle table 12 upper shuttle cart 14, lower shuttle cart 16, cart wheels 18 and 20, tracks 22 and 24, and cylinders 26 and 36. Cylinders 26 and 36 operate to raise and lower shuttle carts 14 and 16 respectively, in a predetermined sequence such that the carts can be aligned with the tracks associated with laser cutting device 11. In essence, the shuttle carts 14 and 16 are used to both transport sheet material to the laser cutting device 11 and to remove the sheet material after parts are cut therein (the skeleton).

FIG. 3 illustrates a perspective view of the conveyor system of the disclosed invention used in a laser material cutting system, according to an aspect. As disclosed in greater detail hereinafter when referring to FIGS. 3*a*-*b* and 14-16, the conveyor 46 may utilize a continuous chain arrangement powered by a motor, wherein the chain arrangement may have an inner single chain and an outer double chain on each side. The conveyor may also have five skid sections 100*a*-*e* of FIG. 3*b*, which may be equally spaced as shown and attached to the continuous chain arrangement, such that the skid sections rotate with the chain arrangement.

Additionally, the conveyor 46 may be, as shown, calibrated in that there may be five fixed spatial positions on the conveyor 46. Of the five fixed spatial positions, there are three operating positions located on the top side of the conveyor 46 and two standby positions located on the bottom side of the conveyor 46. The operating positions may be the loading position ("Position #1") 110, the cutting position ("Position #2") 120, and the parts sorting/unloading position ("Position #3") 130, and the standby positions are Position #4 140 and Position #5 150, as shown in FIG. 3*b*. It should be noted that only the operating positions are visible in FIG. 3*a*, and all positions are shown in FIG. 3*b*. It should be noted in FIGS. 3 and 3*a*-*b* that the operating positions (loading-cutting-sorting) of the conveyor 46 correspond to the processing stations (loading-cutting-sorting) of the system 40.

Figure 3A:
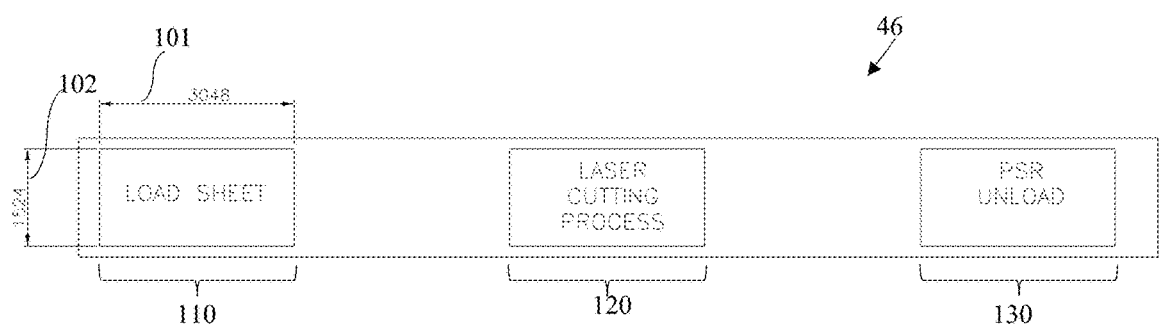
Figure 3B:
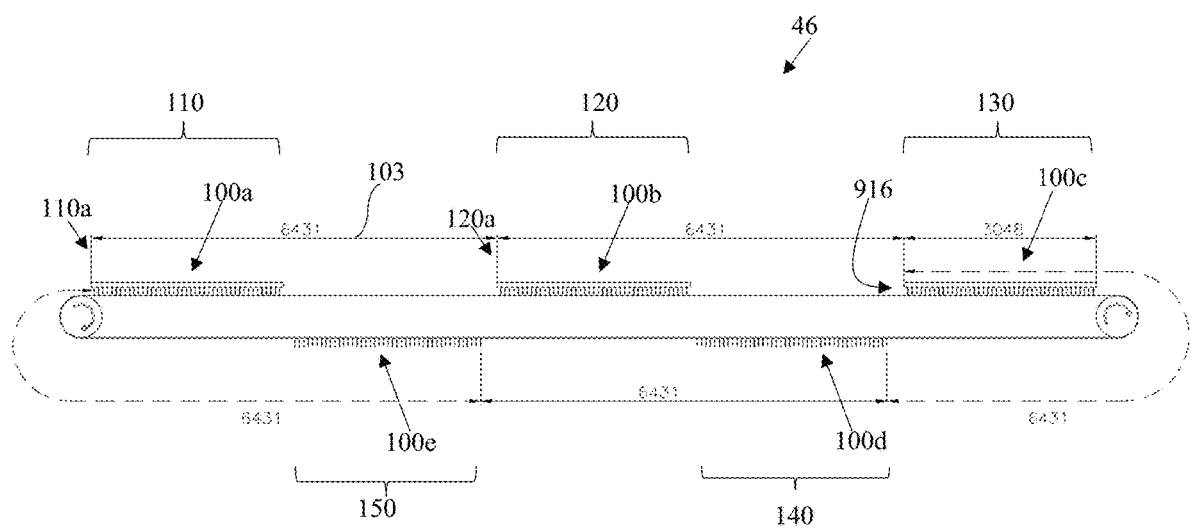

As shown in FIGS. 3*a*-*b*, there may be one skid section 100*a*-*e* in each of the five spatial positions and the skid sections 100*a*-*e* are rotated through the five spatial positions, from one position to the next adjacent position at a time, as the conveyor is indexed.

The following steps (a)-(j) disclose an exemplary process which may be carried out by a system operator to use a cutting system 40 and conveyor 46 in order to quickly process and cut raw materials.

(a) The system operator stores raw material in tower 42 and inputs the raw material characteristics in a conveyor system control 50. As an example, material characteristics may include the material size, thickness, type, sheet quantity, and shelf 83 location.

(b) The system operator then sets up a processing schedule for processor 44 (FIG. 4), via control 50 for example, which will be utilized to control system 40. The program number, material name, and run quantity are entered sequentially, such that the system 40 can track the material as it is taken off the shelfs 83 and goes through the cutting process. The software can run on a conventional Windows OS computer, as disclosed in greater detail hereinafter when referring to the flowcharts illustrated by FIGS. 6-13.

Figure 4:
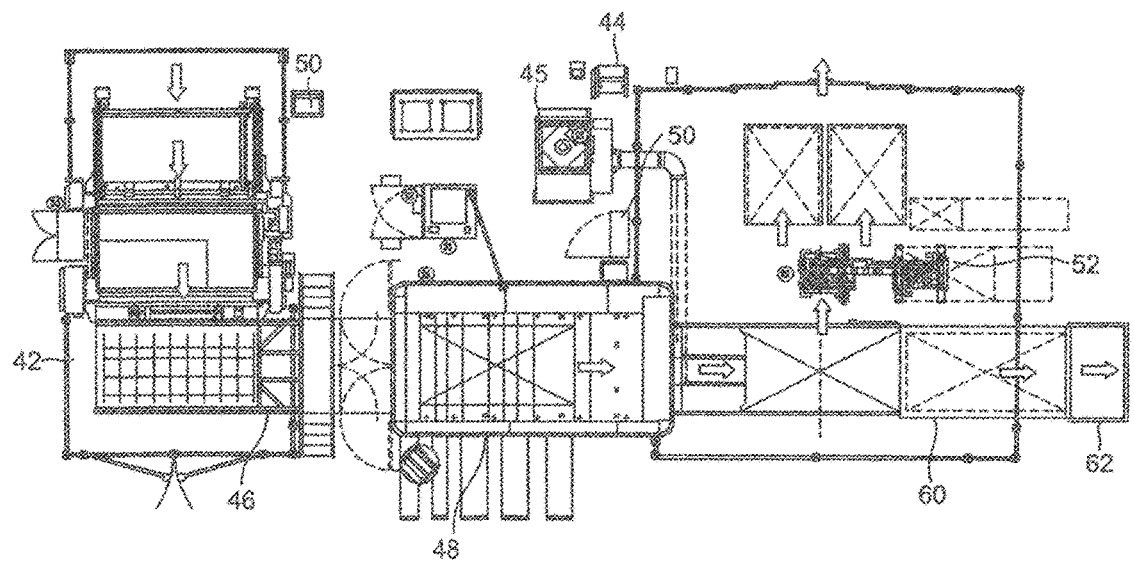
FIGS. 4-5 are plan views of the system shown in FIG. 3 illustrating the movement of the material through the system stations, according to an aspect.
Figure 5:
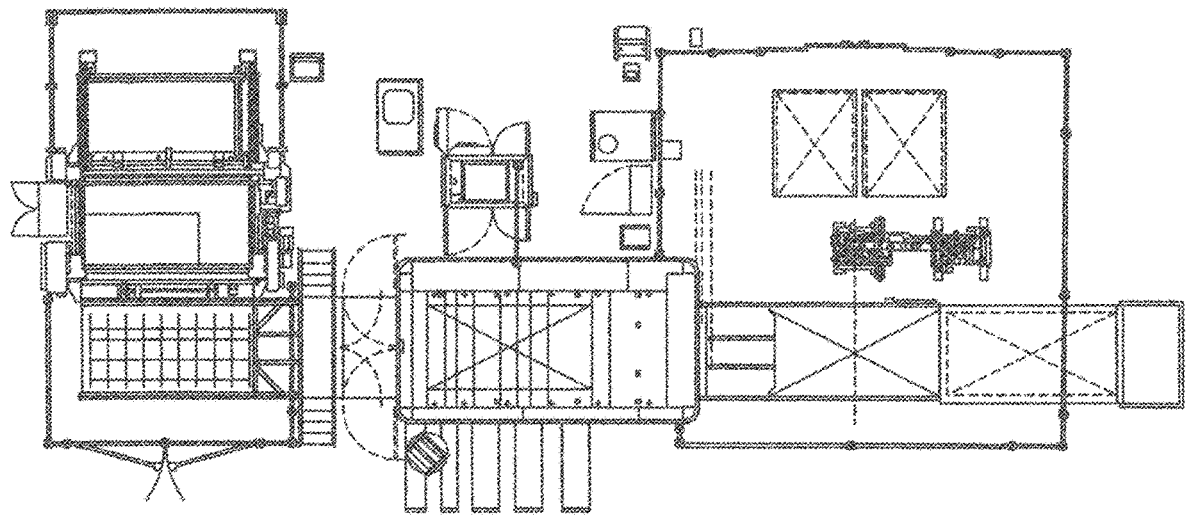

(c) The system operator initiates system operation by turning on processor 44 of FIGS. 4 and 5 and starting the processing schedule, which was set up in the previous step.

(d) Then, the processor 44 orders the loading cart 86 to retrieve the required raw material sheet 81 or 82 from the storage tower 42 and to place the material sheet 81 or 82 onto the conveyor 46, based on the processing schedule. More particularly, a loading cart 86 that is movably attached to the storage tower 42 loads a first piece of raw material 81 or 82 onto a skid section 100*a-e* that is present at that time in Position #1 110 on the conveyor 46, according to the processing schedule requirements stored in processor 44. It should be understood that, when sheets of material are on the conveyor 46, the material sheets are resting atop a skid section on the conveyor 46.

(e) Once the first material sheet has been loaded to Position #1 110 of the conveyor, the conveyor 46 can index the first sheet from the loading position ("Position #1") 110 to the cutting position ("Position #2") 120 in preparation for laser cutting by laser device 48. The storage tower 42 and loading cart 86 are ready for loading the second sheet in the processing sequence, while the first sheet is being moved to Position #2. It should be understood that material is indexed or moved to an adjacent position on the conveyor 46 by indexing the conveyor and thus the skid section which the material rests atop.

(f) When the first material sheet, which is now in Position #2 120, is confirmed by a sensor (not shown) to be in the correct position for laser cutting, the laser cutting system 48 executes the laser program portion of the software, wherein the software determines the dimensions of the part to be cut, and the loading cart 86 loads the second sheet of raw material to Position #1 110.

(g) Once the loading cart 86 has finished loading the second sheet to Position #1 110 and the laser cutting system 48 has finished cutting the first sheet at Position #2 110, then the conveyor system control 50 of FIG. 4 triggers the conveyor 46 to index again and thus simultaneously advance the first sheet from Position #2 120 to a parts sorting position (Position #3) 130 for unloading and advance the second raw sheet material from Position #1 110 to Position #2 120.

(h) Next, the storage tower 42 and loading cart 86 load a new third raw material sheet onto the skid section 100*a-e* present at conveyor Position #1 110, while the laser cutting system 48 executes the laser cutting portion of the software on the second sheet at Position #2 and a parts-sorting robot 52 starts the sorting/unloading sequence on the first cut sheet at Position #3 130. It should be noted that the continued loading of new raw material to conveyor Position #1 110 by the storage tower 42 and loading cart 86 is controlled by the software and depends on the number of raw sheets needed to complete a laser cutting project. In other words, once the required number of raw material sheets have been loaded onto the conveyor 46, the storage tower 42 and loading cart 86 will stop loading new sheets of raw material.

(i) At this stage, the first sheet of cut material is at Position #3 130, the second sheet of raw material is at Position #2, and the third sheet of raw material is being loaded onto the conveyor at Position #1 110. As part of the unloading process, which is taking place on the first sheet of material at Position #3 130, robot 52 may sort and stack cut parts according to the software program. More particularly, robot 52 may stack cut parts 91 at the scheduled quantity, at a designated location (the system operator ensures that the stack height is limited to one that is stable) and may include sensors (not shown) to detect hanging, tipped-up, and missed pick-up of parts, and will stop system operation as these conditions occur.

Again, during the unloading process, the loading cart 86 loads the third raw material sheet to conveyor Position #1 110 and the laser cutting machine completes the laser cutting the second sheet at Position #2. After the loading, cutting, and unloading processes are completed, the conveyor 46 advances, such that the third material sheet is indexed from Position #1 110 to Position #2, the second material sheet is indexed from Position #2 to Position #3, and the skeleton of the first material sheet is moved from to Position #3 130 to the skeleton conveyor 60, as set forth hereinabove and hereinafter in accordance with the schedule established by the software.

(j) Next, as the skeleton conveyor 60 advances, the skeleton parts 92 of the third material sheet remaining after the cut parts are sorted by the robot 52 are forwarded from the skeleton conveyor 60 so they drop into the skeleton collection bin 62. It should be understood that the skeleton conveyor 60 may advance simultaneously with the conveyor 46, depending on the processing schedule.

Thus, one cycle of the processing schedule has been executed and completed by the system 40 and the process can be repeated the required number of times, as set in the processing schedule by the system operator. Again, it should be understood that the conveyor's 46 five skid sections 100*a-e* of FIG. 3*b*, which are attached to the continuous chain arrangement, allow the material processing cycle disclosed hereinabove to be continuously repeated, as disclosed herein.

Figure 13:
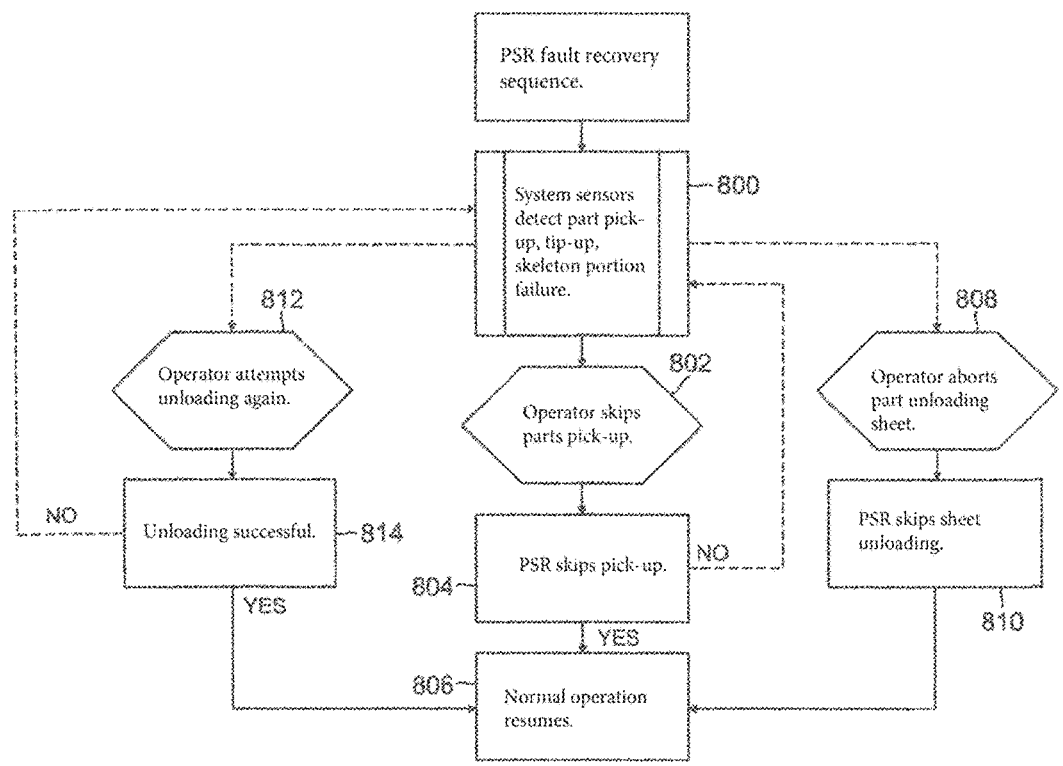

As an option, robot 52 fault recovery may be initiated by the system operator, as disclosed in greater detail when referring to the flowchart shown in FIG. 13. Once a fault is detected, robot 52 may retry parts pick-up, skip current parts pick-up, or abort parts pick-up from the output cut sheet at Position #3 130. Parts not unloaded from the conveyor system by robot 52 may be retrieved at the outer end 60*a* of the skeleton conveyor 60 by hand (the operator may manually "Jog" the skeleton conveyor forward to access parts), such that the operator prevents the parts from dropping into the skeleton collection bin 62.

For safety, the operator may stop the robot 52 operation in order to enter the unloading area where unload carts (not shown) are positioned. The operation can be resumed once the operator exits the area.

As noted hereinabove, a flowchart describing the software used to control the system 40 of the present invention 46 is shown in FIGS. 6-12. The software can run on a conventional Windows OS computer and send job data to the laser process machine automation system. The job data may include the location, size, thickness of the raw or cut material, the numerical control ("NC") program to be executed in the laser cutting machine, and the parts sorting data to be executed by the parts-sorting robot.

The aforementioned job data may be sent at different but synchronized timing as the system control requires.

The software may schedule a plurality of job data, such as job data for two different jobs, to enable the laser cutting system to operate unattended for a period of time, for example. The schedule may be entered into the software by a human system operator or the software may alternatively be configured to automatically load job data using a predetermined interface method.

The software may be able to detect system faults via feedback from sensors on the system 40, then the software may send notification messages to system operators and/or trigger a visual and/or audible alarm. As an example, a system fault may be misaligned sheet material. In addition, the software can output production result information to a system operator, such as the number of cut material sheets, for example.

The advantage of using the conveyor 46 system, with five exemplary sections attached to a continuous chain arrangement, instead of conventional movable tables for handling sheet material, may be that the present invention enables the four processes (load, cutting, unload, and scrap removal) to be done simultaneously and continually at very rapid speeds (a single sheet of material can be processed in approximately thirty seconds, for example). As will be disclosed hereinafter when referring to FIGS. 3*b* and 14-16, the conveyor 46 system is further configured to resist damage from the laser and laser cutting residue (molten metal) as it travels through the laser cutter.

FIG. 3*a* illustrates a simplified top view of a conveyor 46, according to an aspect. As shown, exemplary dimensions 101 and 102 of a skid section may be 3048 mm by 1524 mm.

FIG. 3*b* illustrates a simplified elevation view of a conveyor 46, according to an aspect. As shown in FIG. 3*b* and as mentioned hereinbefore, in an example, a conveyor 46 may have five noncontiguous skid sections 100*a-e* attached to a continuous chain arrangement, with equal spacing between the skid sections. As shown in FIG. 3*b*, in an example, the equal spacing between the skid sections 100*a-e* may be 3,383 mm (i.e., 6431 mm-3048 mm). Additionally, the top side of a conveyor 46 may have three operating positions and two standby positions, the operating positions being a loading position ("Position #1") 110, a laser cutting position ("Position #2") 120, and a parts sorting position ("Position #3") 130, and the standby positions being Position #4 140 and Position #5 150.

As shown in FIG. 3*b*, and as discussed hereinbefore, one skid section 100*a-e* may occupy each of the five positions as the conveyor indexes. For example, skid section 100*a* occupies Position #1, skid section 100*b* occupies Position #2, skid section 100*c* occupies Position #3, skid section 100*d* occupies Position #4, and skid section 100*e* occupies Position #5, as shown in FIG. 3*b*. When the conveyor advances (i.e., when the motor (not shown) rotates the chain arrangement), then the skid sections 100*a-e* will also advance, such that the skid sections 100*a-e* are indexed to the next adjacent position. For example, after the first conveyor advancement, skid section 100*a* will be indexed from Position #1 to Position #2, skid section 100*b* will be indexed from Position #2 to #3, skid section 100*c* will be indexed from Position #3 to Position #4, skid section 100*d* will be indexed from Position #4 to Position #5, and skid section 100*e* will be indexed from Position #5 to Position #1. Similarly, upon the second conveyor advancement, skid section 100*a* will be indexed from Position #2 to Position #3, skid section 100*b* will be indexed from Position #3 to Position #4, skid section 100*c* will be indexed from Position #4 to Position #5, skid section 100*d* will be indexed from Position #5 to Position #1, and skid section 100*e* will be indexed from Position #1 to Position #2. Thus, it should be understood that the conveyor 46 may continually advance and stop, such that each skid section 100*a-e* may be advanced through all five of the fixed positions in an indexing and cyclical manner. Additionally, it should be noted that, while in this example the motors (not shown) of the conveyor 46 rotate the continuous chain arrangement in a clockwise direction, the conveyor 46 can be configured to rotate in a counterclockwise direction.

As shown in FIG. 3*b*, the locations of the operating positions may be configured such that the skid section 100*a* in Position #1 110 is at the left-most side on the top of the conveyor 46, the skid section 100*b* in Position #2 120 is centered on the top side of the conveyor 46, and the skid section 100*c* in Position #3 130 is at the right-most side on the top of the conveyor 46. More particularly, the operational positions and the skid sections present there at a given time (100*a-c* in FIG. 3*b*) are aligned with the respective processing stations of the system 40, namely Position #1 is aligned, to allow for material loading, Position #2 is aligned to allow for laser cutting, and Position #3 is aligned to allow for parts sorting and/or unloading.

Also shown in FIG. 3*b*, the standby positions may be configured such that they are staggered with the operating positions, i.e., the skid section 100*d* in Position #4 140 is in-between the skid sections 100*b* and 100*c* and the skid section 100*e* in Position #5 150 is in-between the skid sections 100*a* and 100*b* when viewed from above. More particularly, the two standby positions Position #4 140 and Position #5 150 are configured in staggered manner, such that the laser machine 48 and/or falling slug do not cut or otherwise damage the skid sections 100*d-e*, thus further preventing the skid sections in the standby positions from being damaged during material processing. The staggered configuration may also allow small parts and/or slug from laser cutting at 120 to fall down below conveyor 46, without being impeded by the skids below that are in the standby position.

Additionally, the spacing 103 between the beginning of each of the skid sections 100*a-e* can be chosen to further protect the skid sections in the standby positions. For example, the width 101 of FIG. 3*a* of a skid section may be 3048 mm and the spacing 103 between the beginning 110*a* of the skid section 100*a* in Position #1 and the beginning 120*a* skid section 100*b* in Position #2 may be 6431 mm. Thus, the gap (6431 mm-3048 mm=3383 mm) between the end of skid section 100*a* and the beginning of skid section 100*b* may be large enough that skid section 100*e* can fit entirely in the gap. Thus, the configuration of the fixed positions may be chosen such that the skid sections are protected from damage during the laser cutting process. Another advantage of having equal spacing 103 between the beginning of each of the skid sections 100*a-e* is that when the skid sections are indexed, they can precisely occupy the next adjacent position.

FIGS. 6-12 illustrate an exemplary operational flowchart for system 40.

Figure 6:
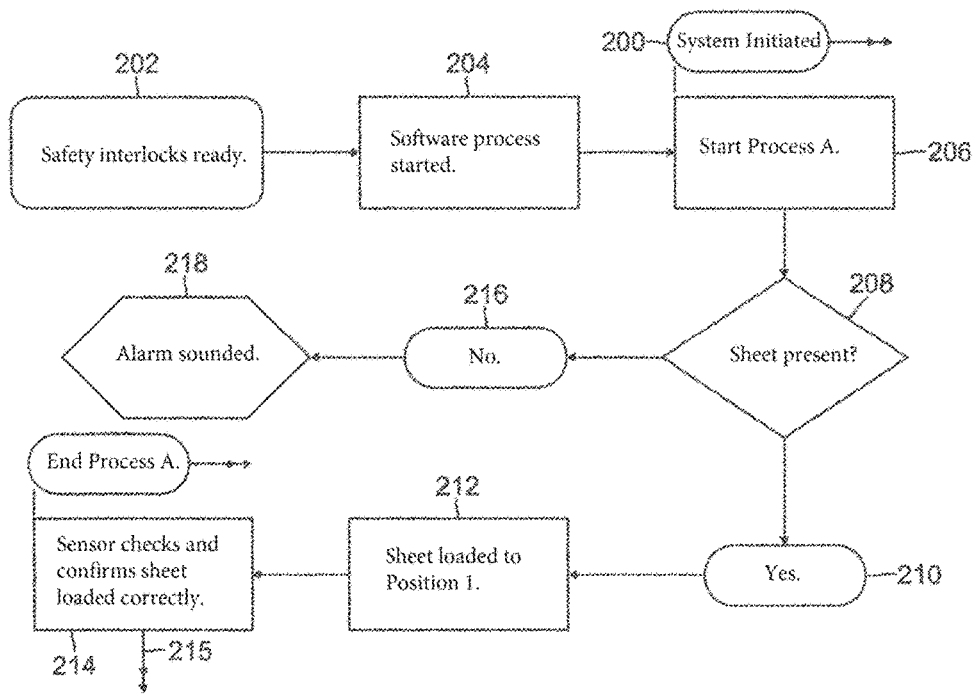

FIG. 6 shows a process start block (200) which, when activated by an operator, causes system 10 to be initialized and the laser cutting operation to proceed. All safety interlocks are placed in the ready state (block 202) which, in turn, causes the computer to start the software process (block 204), causing the conveyor controller 50 to receive a sheet load command (block 206). If the required sheet is determined to be present (blocks 208 and 210), the sheet is loaded to the conveyor first position (block 212). A sensor then determines if the material is loaded successfully (block 214). The next process sequence is initiated via a signal on lead 215; if the required sheet is not in the material storage tower (block 216), an alarm is sounded (block 218).

Figure 8:
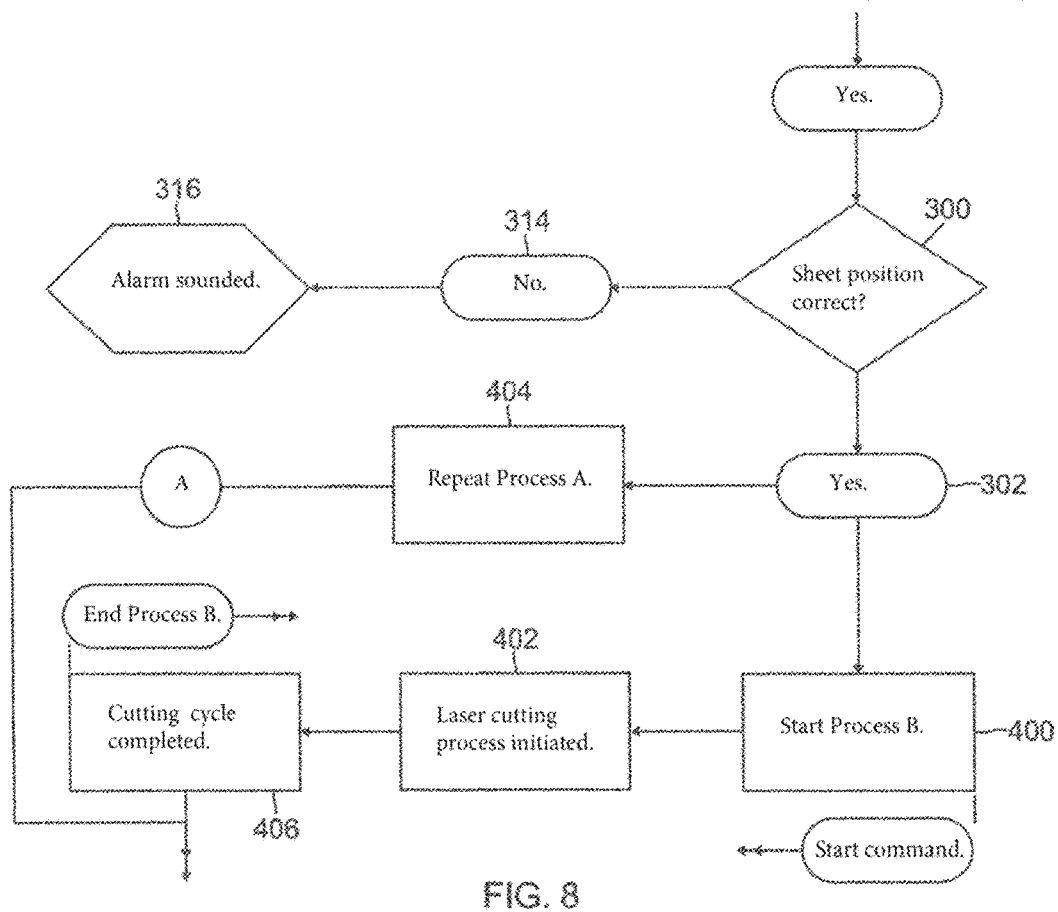

Referring to FIG. 7, if the conveyor sensor confirms the sheet position (blocks 300 and 302), a control block confirms everything is ready (block 304) after a short delay and a conveyor move command is issued (block 306). The system then determines whether the conveyor is in the proper position (block 308). If so, the conveyor sensor confirms the position of the sheets (blocks 300, 302). If the conveyor position ready is not confirmed (block 314), an alarm (block 316) is issued. Referring to FIG. 8, once the conveyor sensor confirms the position of the sheets, the laser cutting unit receives a start command (block 400), which is the beginning of process B and begins the cutting process (block 402) (this corresponds to the second position of the sheet being cut). If the loading of the follow-up sheet is scheduled, process A is repeated (block 404). A signal is issued when the cutting cycle is completed (block 406), thus ending process B.

Figure 9:
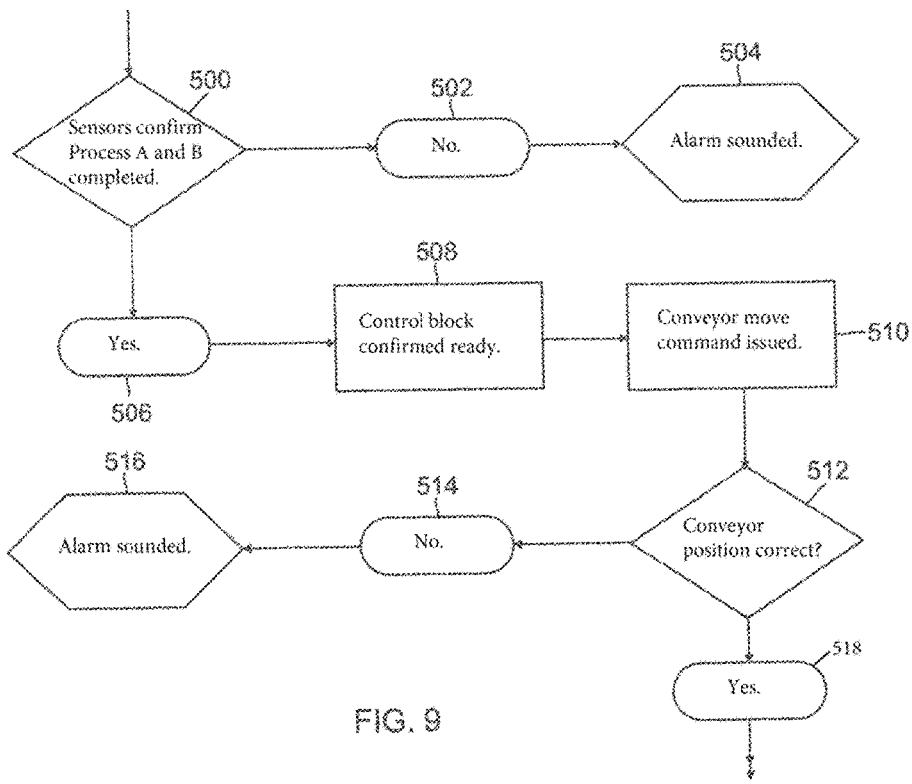
Figure 10:
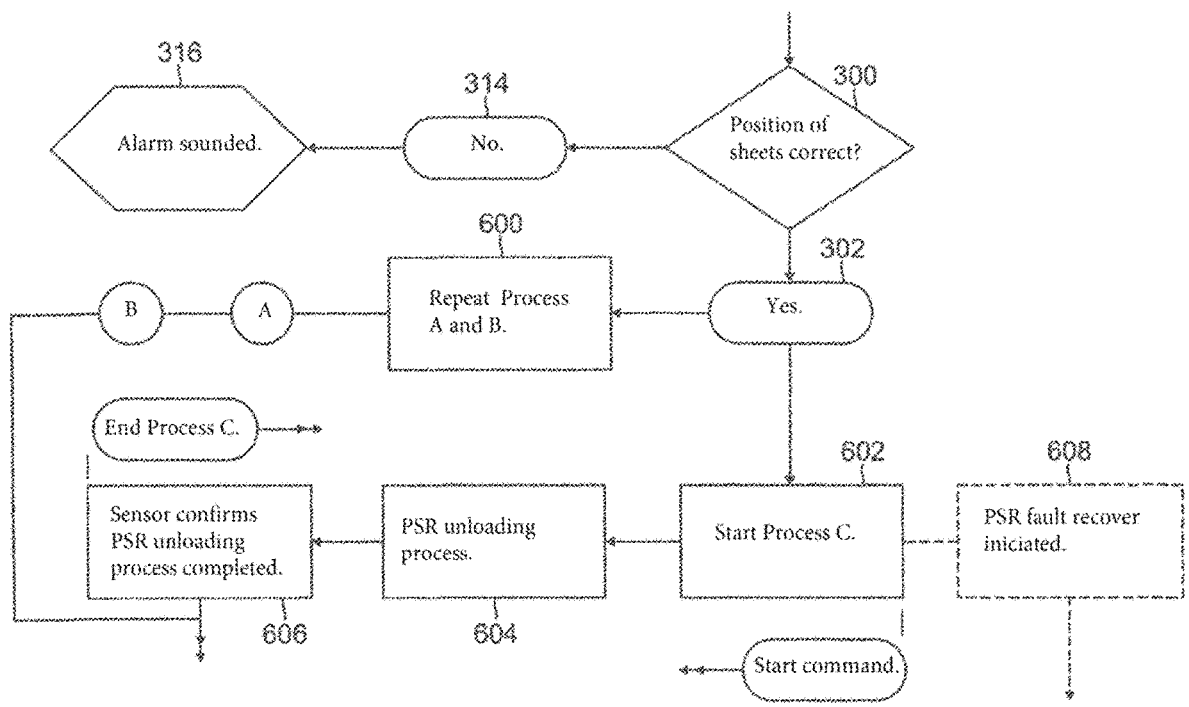

The portion of the operation flowchart shown in FIG. 9 confirms that processes A and B have been completed (block 500). If not completed, an alarm is initiated (block 502, 504). If process A and B are confirmed to be completed (block 506), and the control block is confirmed to be ready (block 508), a conveyor move command is issued (block 510). The system then determines if the conveyor position is correct (block 512); if not, an alarm indication is issued (block 514, 516). Referring to FIG. 10, if the conveyor sensor confirms that the position of the next sheet is correct, processes A and B are repeated if scheduled (block 600). At the same time, the parts-sorting robot (PSR) receives a start command (block 602), which is the start of process C. The PSR unloading cycle starts at the third position (block 604) and a signal indicating that the PSR unloading has been completed (block 606) and process C then ends.

Figure 12:
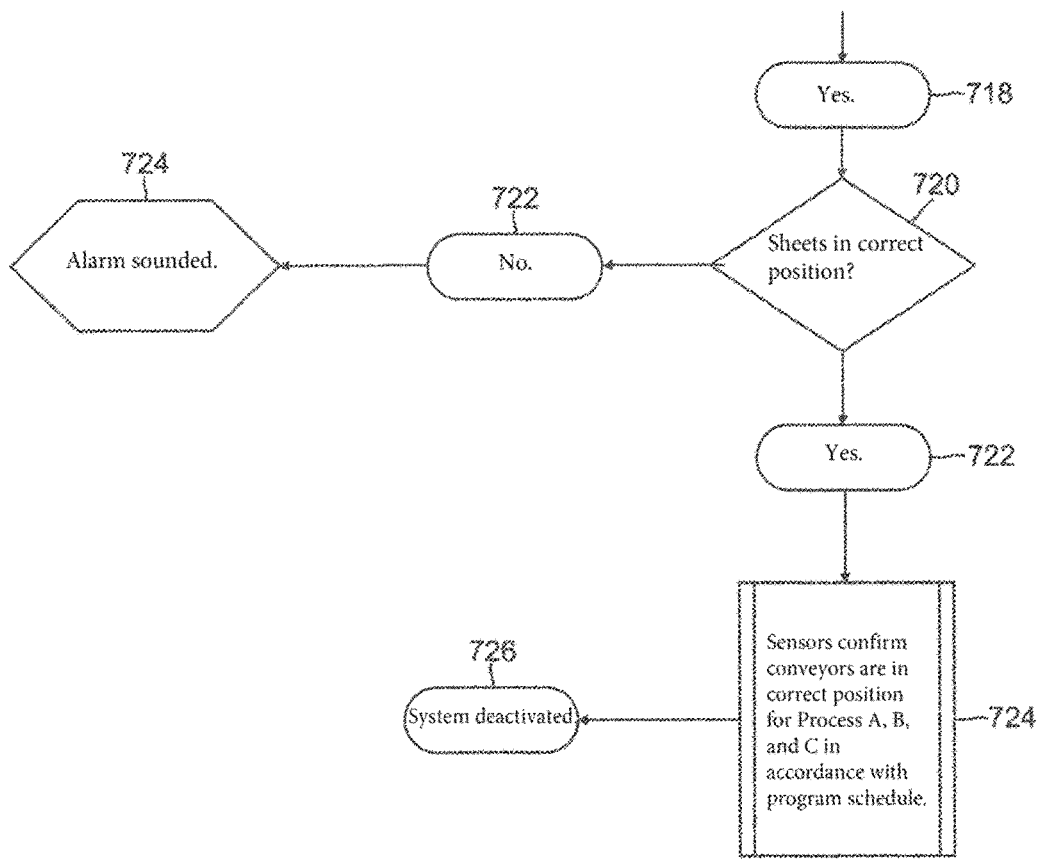

It should be noted that the machine operator could initiate a PSR fault recover (block 608), the flowchart portion therefor being set forth in FIG. 12.

Figure 11:
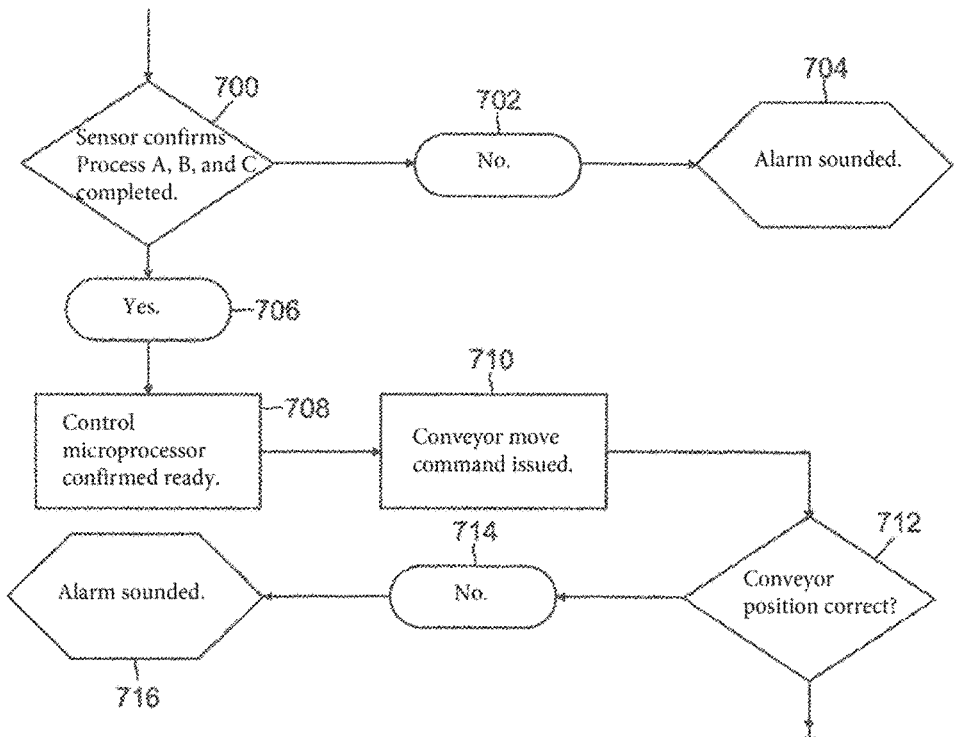

Referring to FIGS. 11 and 12, the system determines whether processes A, B and C have been completed (block 700). If not, an alarm is initiated (block 702, 704). If it is confirmed that processes A, B and C are completed, the control microprocessor is confirmed to be ready after a short (i.e. three-second) delay (block 706, 708). A conveyor move command signal is issued (block 710) and the system then determines if the conveyor position is ready (block 712). If not, an alarm is generated (block 714, 716). If the conveyor position is ready, a conveyor sensor confirms whether the sheets are in the correct positions (block 720); if not, an alarm is sounded (block 722, 724). If the conveyor sensor confirms that the sheets are in the correct position, process A (sheet load), process B (laser cutting) and process C (PSR unload), in accordance with the program schedule (box 722, 724), have been completed and the system is deactivated (block 726).

The parts-sorting fault recovery flowchart sequence is shown in FIG. 13. If the system sensors detect part pick-up failure, tip-up, or the skeleton portion of the sheet is still attached (block 800), the system operator can skip the unloading of that sheet (block 802). The PSR skips the pick-up and is directed to the next part (block 804), and the PSR resumes normal operation (block 806). If the PSR does not skip pick-up, the system then returns to the sensors detect part pick-up process (block 800). Note that the operator has the option of aborting the part unloading the current sheet as the conveyor advances (block 808, 810) and the PSR then resumes normal operation (block 806). Note that the operator also has the option of attempting to unload the part again (block 812, 814). If successful, the PSR resumes normal operation (block 806). If the pick-up is unsuccessful, the system returns to the sequence wherein the sensors operate whether part pick-up has failed (block 800).

Figure 15:
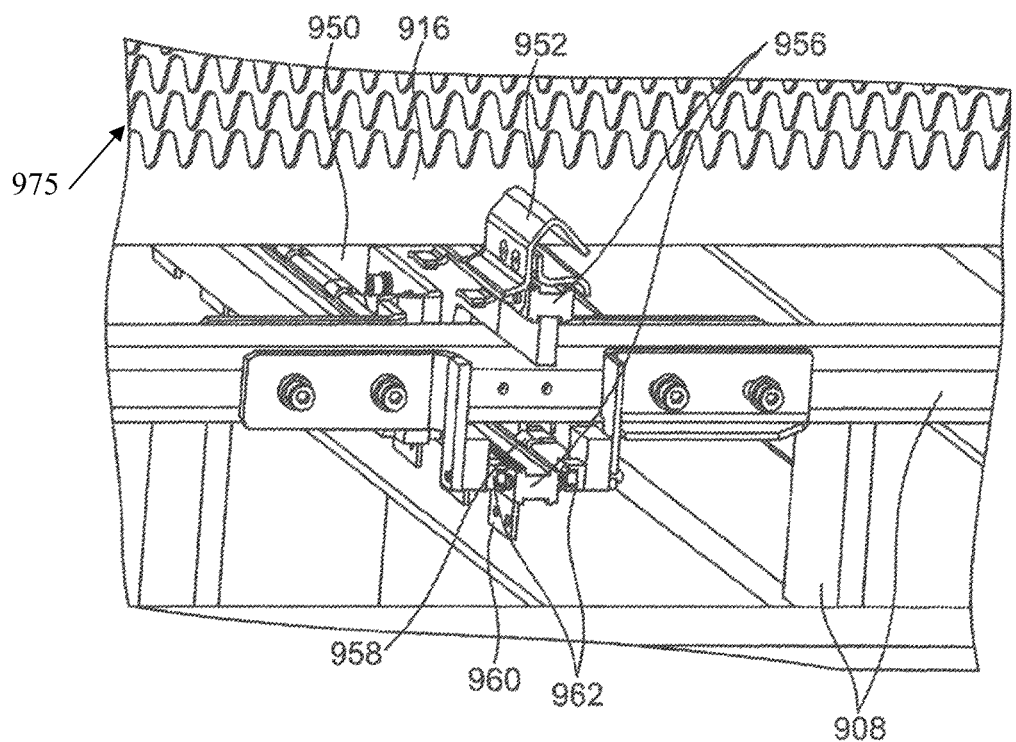
FIG. 15 is a cut away view across the conveyor illustrating the inner single chain assembly, according to an aspect.
Figure 16:
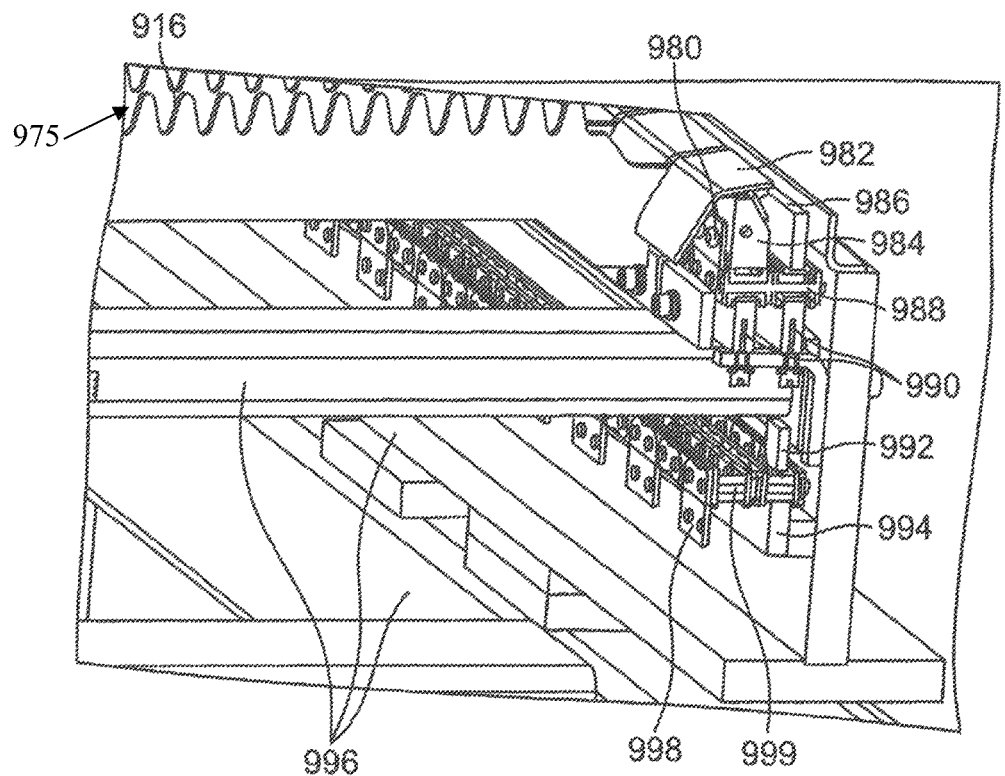
FIG. 16 is a cut away view across the conveyor illustrating the outer double chain assembly, according to an aspect

As noted hereinabove, a key feature of the present invention is the "endless" conveyor system which enables material to be cut at speeds that exceed those currently available. Details of the conveyor construction which supports this feature are shown in FIGS. 14-16.

Figure 14:
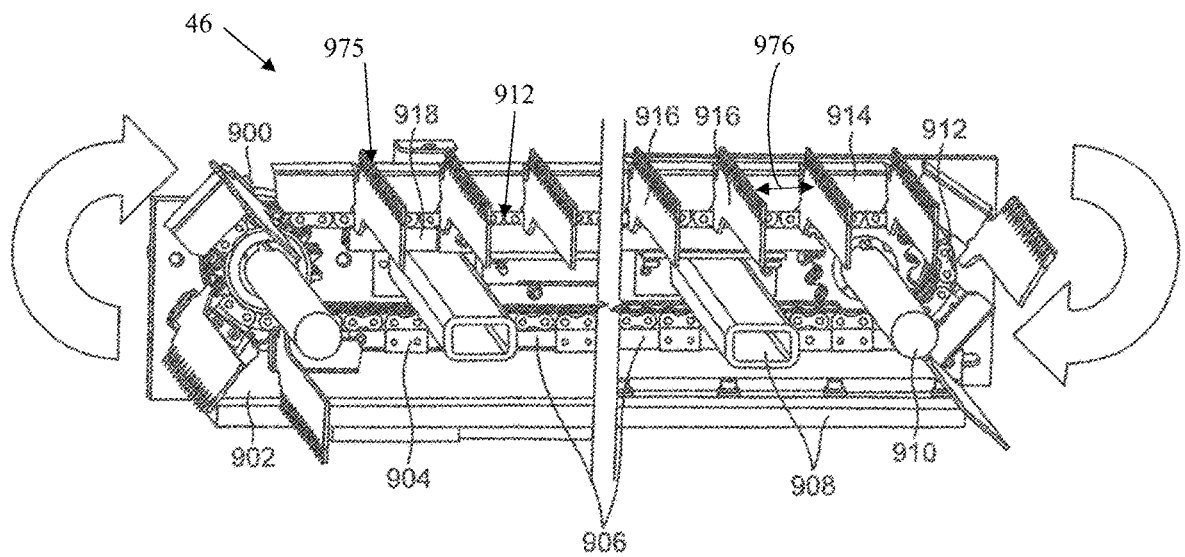
FIG. 14 is a cut away view along the length of the disclosed conveyor, according to an aspect.

FIG. 14 is a cut away view along the length of the conveyor, wherein a center portion of the conveyor has been cut out, according to an aspect. As an example, the left half of the cut away view may illustrate the skid section 100e of FIG. 3b as it is indexed from Position #5 to Position #1 and the right half of the view may illustrate the skid section 100c of FIG. 3b as it is indexed from Position #3 to Position #4. Thus, FIG. 14 illustrates a cut away view of the conveyor 46 as the endless outer chain member 975 rotates in a clockwise direction to index the five skid sections to an adjacent fixed position, as described hereinbefore.

The view of the conveyor 46 shown in FIG. 14 may include the following additional components:

(1) Bolt 900, which holds the chain covers 914 and the skids 916 at both transversal ends of the conveyor to the outer single or double roller chain 912, such that the skids 916 and chain covers 914 are attached to the chain block and move with the endless chain 912 as it is rotated;

(2) Drive shaft 902;

(3) Outer plate 904;

(4) Lower support rails 906;

(5) Conveyor frame 908;

(6) Idler shaft 910;

(7) Outer double or single roller chain 912, at both transversal ends of the conveyor 46;

(8) Chain cover 914;

(9) Skids 916; and

(10) Upper support rails 918.

A servo motor (not shown) drives the conveyor forward by propelling the drive shaft 902 where chain sprockets are mounted for both inner chain 956 (FIG. 15) and outer roller chains 912 and 999 (an outer chain on each side of the conveyor). Chain movement is synchronized by utilizing a single drive shaft 902. The servo motor precisely controls conveyor position while sensors confirm material placement during loading and conveying operations. Skids 916 may be arranged into 5 (five) noncontiguous and/or staggered sections at intervals which allow proper spacing for utilizing loading, cutting, unloading, and standby areas simultaneously, as disclosed in greater detail hereinbefore.

The conveyor skids 916 may provide as shown open areas between them for air circulation during the cutting process and enables a laser system dust collector (45, FIG. 4) to remove contaminants suspended in the air of the machine cavity during the laser cutting operation.

As shown in FIG. 14, the conveyor skids 916 may also be thin plates with small intervals 976 (e.g., 75 mm) between each skid 916 in order to allow the laser to pass through and also slug to pass through intervals 976 into a collector system in place at the base of the laser cutting machine, thus reducing damage to the skids 916.

Being attached to chain member 912, the chain covers 914 travel with the skids and may protect the chain block from the laser cutting machine. Additionally, the tip edge of the skids 916 may be pointed, dented and spiked as shown at 975, so as to further reduce the likelihood of being hit and cut by the laser beam of the laser cutting machine, when processing a material sheet resting thereon. Thus, the conveyor and conveyor components (i.e., skids 916, chain block, etc.) may resist damage during the laser cutting process.

It should be noted again that skids 916 may be attached and configured in five sections for reasons described hereinabove and also to reduce cost of material and components; attaching skids to the entire endless chain member 912 would also increase the movable mass, thus requiring larger size motor. Additionally, it should be noted again that the chain covers 914 are movably attached to the endless chain member 912 in part because there may be too little space (on the sides of the conveyor 46, for outer chain members 912, 999) or no space (in the center of the conveyor 46, for inner chain member 956) to add fixed chain covers inside laser machine. Further, fixed chain covers would not protect the endless chain members 912, 956, 999 from debris throughout the entire processing cycle. For example, the endless chain members 912, 956, 999 could also be damaged when in the parts pickup position (Position #3) 130 due to motion and/or small vibrations or other small debris created during the laser cutting process falling on the chain arrangement.

To further reduce conveyor's 46 weight, skids 916 may be made from a flat panel (e.g., thin plates), as shown in FIGS. 14-16. The panel may also be profiled/undulated for added strength and rigidity of skids 916, to ensure precise processing of the material sheets resting thereon.

FIG. 15 is a cut away view across the conveyor illustrating the inner single chain assembly, according to an aspect. The inner single chain assembly may comprise the following components:
  (1) Upper support rail 950;
  (2) Skids 916, which, again, may be spiked to reduce the likelihood the skids will be damaged by the laser cutting machine;
  (3) Chain cover 952;
  (4) Inner roller chain 956;
  (5) Bottom chain tab 958;
  (6) Plate 960 for mounting chain cover 914;
  (7) Lower support rails 962; and
  (8) Conveyor frame 908.

The inner single roller chain is driven by the conveyor drive shaft 902 (FIG. 14), the chain being driven by sprockets mounted thereon. Upper support rails 950 may support and guide the chain at the rollers. The lower support rails 962 can potentially eliminate chain sag by carrying the chain and skid weight using chain tabs 958 integrated into alternating chain side plates.

The outside plate 980 (FIG. 16) of the inner section of the single roller chain may be extended to provide a mounting surface for the chain covers 982. These can provide center support for the skids 916 and protect the chain and drive mechanisms from the laser cutting residue (molten metal particles) that is expelled during the laser cutting process.

It should be noted that the skids 916 and chain covers 914, which can become damaged during the processing cycle (particularly during laser cutting), can easily be replaced when residue builds up and/or when exposure to the laser cutting beam reduces the integrity or functionality of these components. In other words, the skids 916 and chain covers 914 can easily be replaced when they are damaged enough that the skids may not reliably support the material sheets, or the chain covers 914 no long sufficiently protect the endless chain members 912, 956, 999, thus reducing cost by potentially increasing the longevity of the conveyor or conveyor components.

FIG. 16 is a cut away view across the conveyor illustrating the outer double chain assembly, according to an aspect. The outer double chain assembly may comprise the following components:
  (1) Skids 916 which are bolted at both ends to chain block 900;
  (2) Chain block 984 which is bolted to chain outer plate 980;
  (3) Chain cover 904 which is bolted to chain block 984;
  (4) Top chain lock 986;
  (5) Upper section of endless outer (e.g., double roller) chain 988;
  (6) Support rails 990;
  (7) Low chain lock 992;
  (8) Low chain support 994;
  (9) Conveyor frame 996;
  (10) Outer plate 998 which carries chain, block 984; and
  (11) Lower section of endless outer (e.g., double roller) chain 999.

The outer double roller chain 988 may be driven by the conveyor drive shaft 902 and the outer most chain section is driven by sprockets mounted on the drive shaft. The inner section of the double chain may have a common roller pin with the outer chain and may also be driven by sprockets mounted on the same drive shaft. Chain locks and support rails support and guide the chain on its rollers and eliminates sag.

The outer plate of the inside section of the double roller chain 988 may be extended to provide a mounting surface for the chain block 984. Which may connect the miler chain 984 and skids 916, allowing the chain to carry them around the conveyor as the conveyor indexes forward. The skids 916 can provide the resting surface for the sheet material being loaded onto the conveyor and allows cutting by the laser machine 48 while supporting cut part shapes until unloaded at the end.

The chain covers 914 may be bolted on by their mounting tab which may be inserted between the chain blocks and skids. These may protect the chain and drive mechanisms from the laser cutting residue (molten metal particles) that is expelled during the laser cutting process.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

Claim limitations should be construed as means-plus-function limitations only if the claim recites the term "means" in association with a recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. A conveyor system for rapidly moving and simultaneously processing material sheets through a plurality of processing stations, the conveyor system comprising:
    a chain member that moves in an endless loop;
    a drive shaft that engages and drives the chain member;
    a plurality of skids that are attached to portions of the chain member, such that to form a conveyor having a plurality of noncontiguous skid sections for supporting material sheets, the noncontiguous skid sections moving with the chain member in the endless loop;
    a plurality of chain covers that are attached to same portions of the chain member extending within the plurality of skid sections, the chain covers protecting the chain member from the processing stations' operations, and moving with the chain member and with the skid sections in the endless loop;
    wherein the plurality of noncontiguous skids sections are arranged such that some of the skid sections are in operational positions at the top of the conveyor while the remaining skid sections are in standby and staggered positions at the bottom of the conveyor;
    wherein the conveyor indexes through the plurality of processing stations, such that, after each indexing, the conveyor has one skid section that is in operational position associated with each of the plurality of processing stations;
    thus allowing each of the plurality of processing stations to operate simultaneously on the associated skid section, during each time period when the conveyor is stopped, after each indexing.

2. The conveyor system of claim 1, wherein the plurality of skids form five noncontiguous skid sections that are spaced apart, such that, after each indexing of the conveyor, three of the skid sections are in operational positions at the top of the conveyor in association with three processing stations, and, two of the skid sections are in standby position at the bottom of the conveyor.

3. The conveyor system of claim 1, wherein each of the plurality of skids have a pointed and dented edge that supports the material sheet resting thereon, thus reducing the likelihood of being cut while a laser processing station performs cuts into the material sheet.

4. The conveyor system of claim 1, wherein each of the plurality of skids are made of a flat panel, for reduced weight of the conveyor.

5. The conveyor system of claim 1, wherein, the plurality of skids are arranged at intervals which allow small shapes cut from the material sheet to pass downwards through the conveyor.

6. The conveyor system of claim 1, wherein the chain member comprises an outer chain on each side of the conveyor and an inner chain disposed in the center of the conveyor, between the outer chains.

7. A conveyor system for rapidly moving and simultaneously processing material sheets through a plurality of processing stations, the conveyor system comprising:
    a chain member that moves in an endless loop;
    a drive shaft that engages and drives the chain member;
    a plurality of skids that are attached to portions of the chain member, such that to form a conveyor having a plurality of noncontiguous skid sections for supporting material sheets, the noncontiguous skid sections moving with the chain member in the endless loop;
    wherein, each of the plurality of skids have a pointed and dented edge that supports the material sheet resting thereon, thus reducing the likelihood of being cut while a laser processing station performs cuts into the material sheet;
    wherein the plurality of noncontiguous skids sections are arranged such that some of the skid sections are in operational positions at the top of the conveyor while the remaining skid sections are in standby positions at the bottom of the conveyor;
    wherein the conveyor indexes through the plurality of processing stations, such that, after each indexing, the conveyor has one skid section that is in operational position associated with each of the plurality of processing stations;
    thus allowing each of the plurality of processing stations to operate simultaneously on the associated skid section, during each time period when the conveyor is stopped, after each indexing.

8. The conveyor system of claim 7, wherein the plurality of skids form five noncontiguous skid sections that are spaced apart, such that, after each indexing of the conveyor, three of the skid sections are in operational position at the top of the conveyor in association with three processing stations, and, two of the skid sections are in standby position at the bottom of the conveyor.

9. The conveyor system of claim 7, wherein each of the plurality of skids are made of a flat panel, for reduced weight of the conveyor.

10. The conveyor system of claim 7, wherein, the plurality of skids are arranged at intervals which allow small shapes cut from the material sheet to pass downwards through the conveyor.

11. The conveyor system of claim 7, wherein the chain member comprises an outer chain on each side of the conveyor and an inner chain disposed in the center of the conveyor, between the outer chains.

12. A conveyor system for rapidly moving and simultaneously processing material sheets through a plurality of processing stations, the conveyor system comprising:
   a chain member that moves in an endless loop;
   a drive shaft that engages and drives the chain member;
   a plurality of skids that are attached to the chain member, such that to form a conveyor having a plurality of noncontiguous skid sections for supporting material sheets, the noncontiguous skid sections moving with the chain member in the endless loop;
   wherein the plurality of noncontiguous skids sections are arranged such that some of the skid sections are in operational positions at the top of the conveyor while the remaining skid sections are in standby positions at the bottom of the conveyor;
   wherein the conveyor indexes through the plurality of processing stations, such that, after each indexing, the conveyor has one skid section that is in operational position associated with each of the plurality of processing stations; thus allowing each of the plurality of processing stations to operate simultaneously on the associated skid section, during each time period when the conveyor is stopped, after each indexing.

13. The conveyor system of claim 12, wherein the plurality of skids form five noncontiguous skid sections that are spaced apart, such that, after each indexing of the conveyor, three of the skid sections are in operational position at the top of the conveyor in association with three processing stations, and, two of the skid sections are in standby position at the bottom of the conveyor.

14. The conveyor system of claim 12, wherein each of the plurality of skids have a pointed and dented edge that supports the material sheet resting thereon, thus reducing the likelihood of being cut while a laser processing station performs cuts into the material sheet.

15. The conveyor system of claim 12, wherein each of the plurality of skids are made of a flat panel, for reduced weight of the conveyor.

16. The conveyor system of claim 12, wherein the conveyor comprises a plurality of chain covers that are attached to the chain member to protect the chain member and that move with the chain member in the endless loop.

17. The conveyor system of claim 12, wherein, the plurality of skids are arranged at intervals which allow small shapes cut from the material sheet to pass downwards through the conveyor.

18. The conveyor system of claim 12, wherein the chain member comprises an outer chain on each side of the conveyor and an inner chain disposed in the center of the conveyor, between the outer chains.

* * * * *